Feb. 2, 1965 W. J. YOUNG 3,168,186
APPARATUS FOR ORIENTING HOLLOW-BODIED ARTICLES
Filed Dec. 11, 1962 5 Sheets-Sheet 1

INVENTOR.
William J. Young
BY
ATTORNEY.

INVENTOR.
William J. Young
BY Hoge T. Sutherland
ATTORNEY.

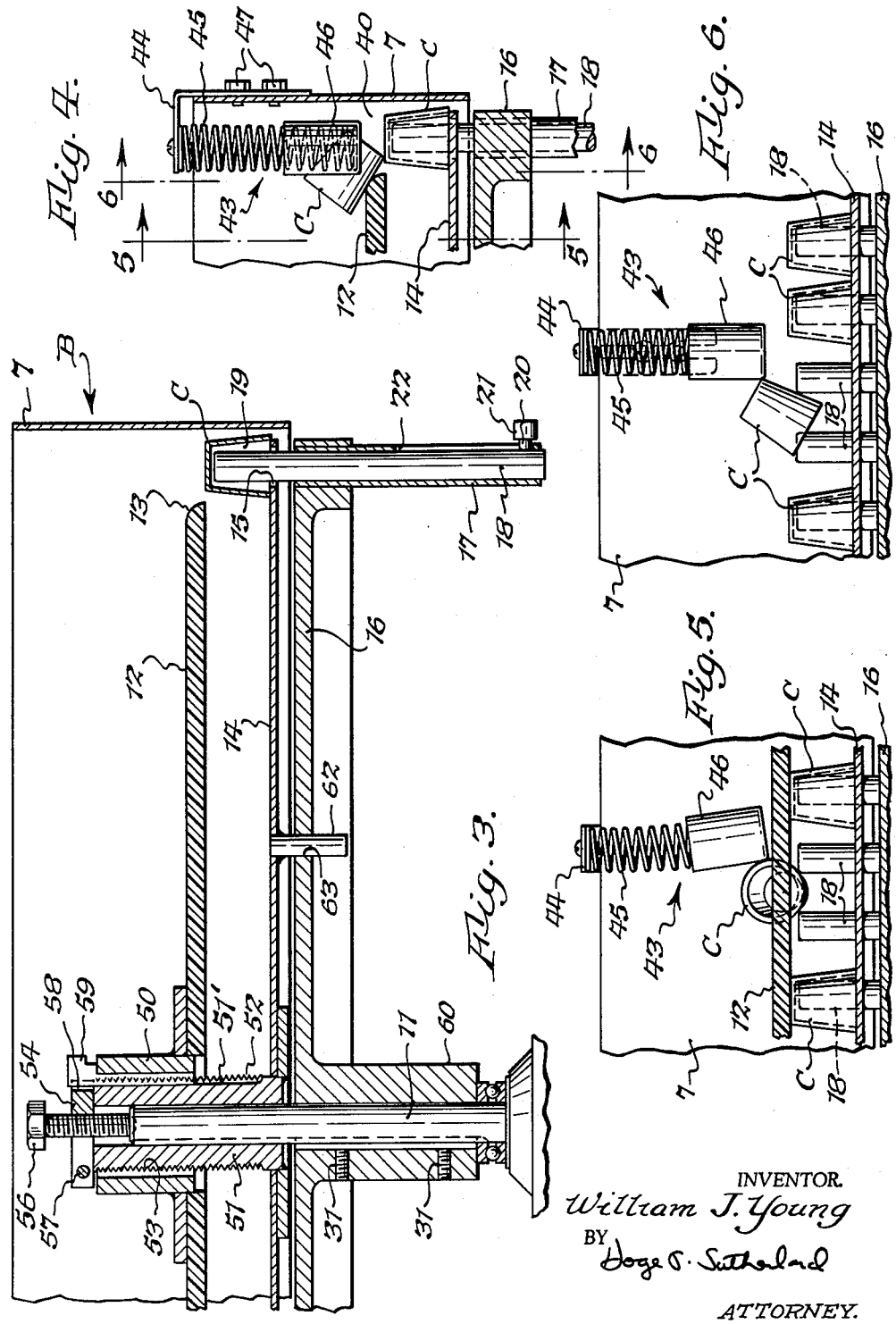

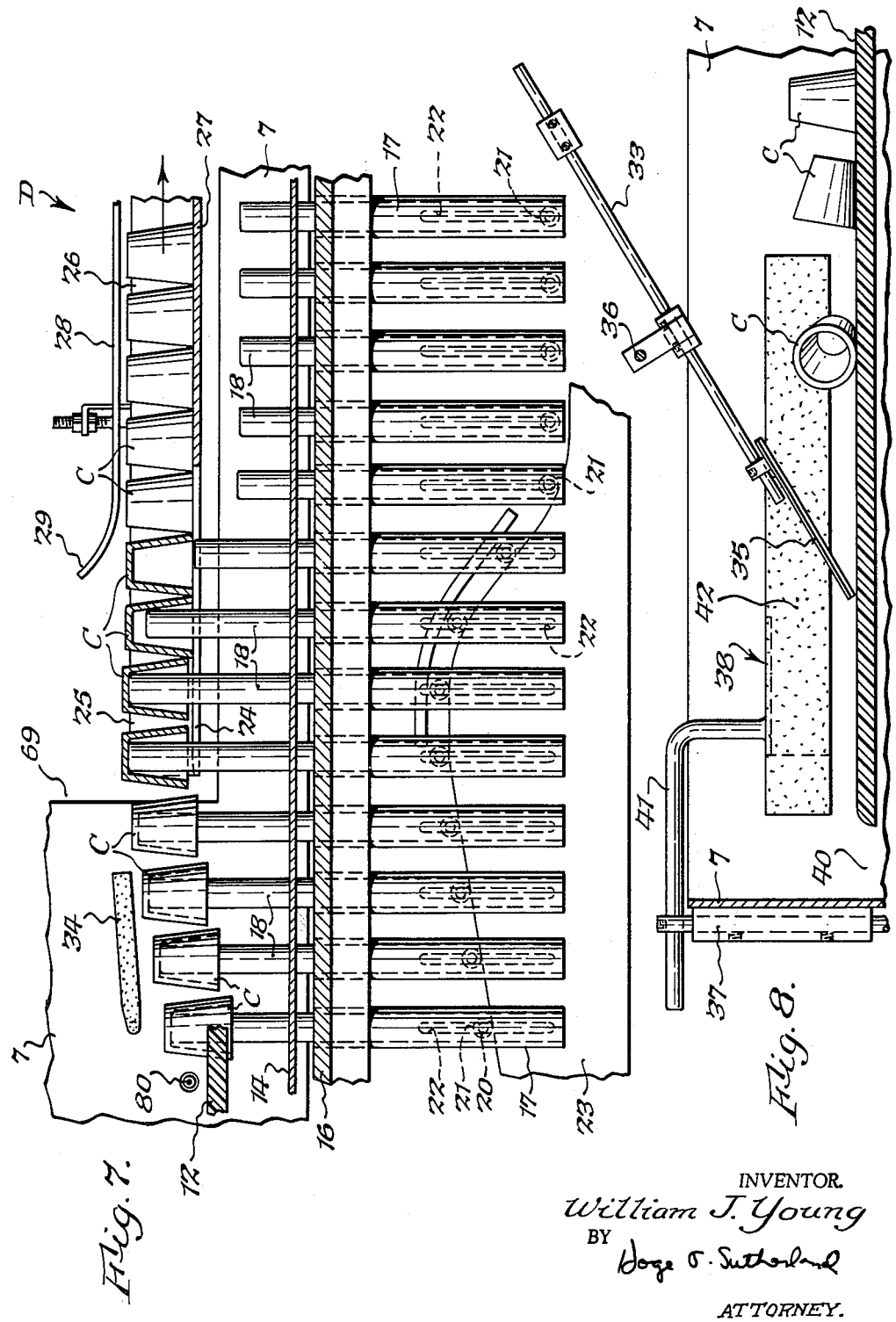

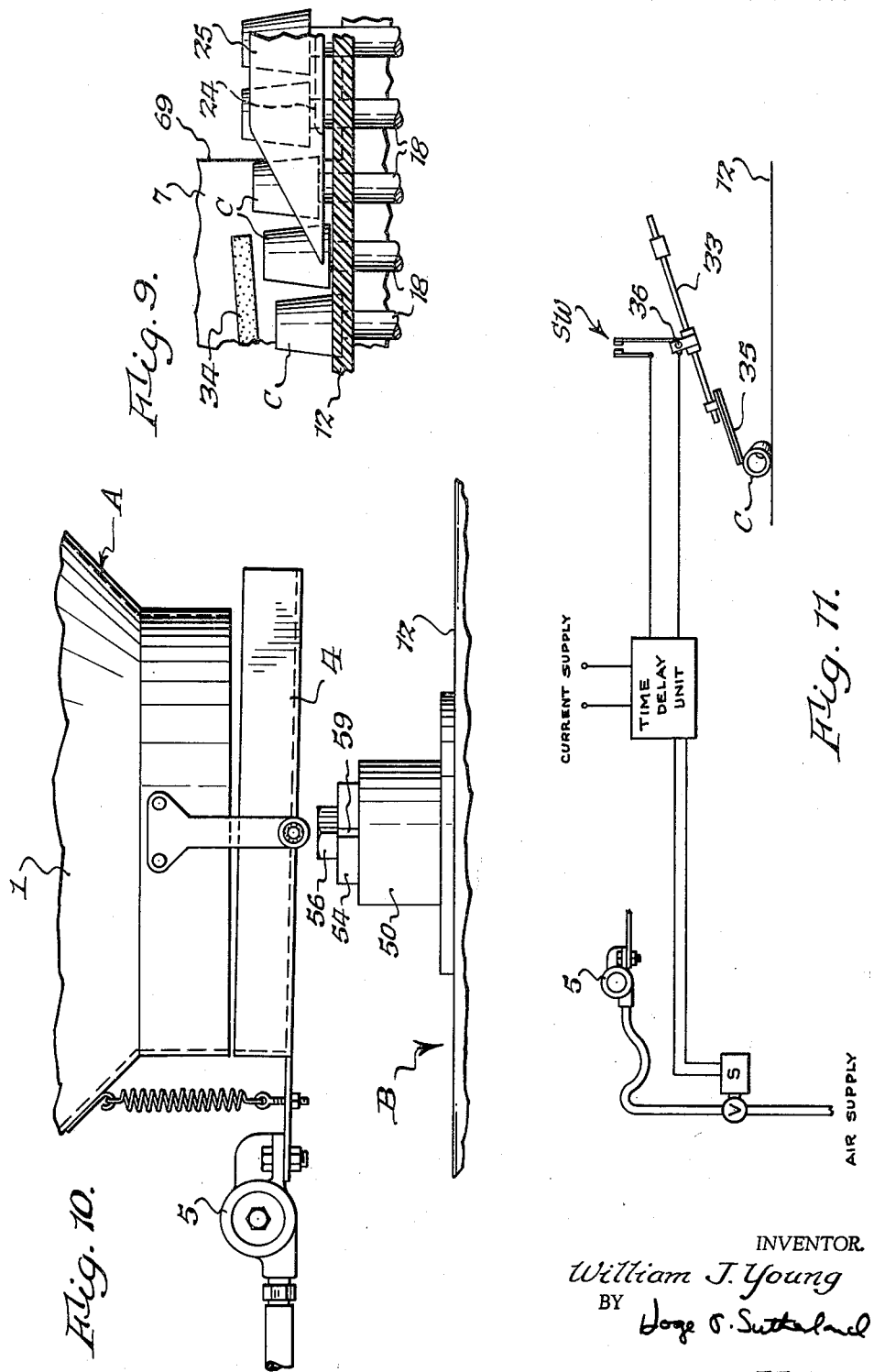

United States Patent Office 3,168,186
Patented Feb. 2, 1965

3,168,186
APPARATUS FOR ORIENTING HOLLOW-
BODIED ARTICLES
William J. Young, Buffalo, N.Y., assignor to Consolidated
Packaging Machinery Corporation, Buffalo, N.Y., a
corporation of New York
Filed Dec. 11, 1962, Ser. No. 243,898
11 Claims. (Cl. 198—33)

This invention relates to an apparatus for feeding, orienting and delivering articles and, more particularly, to an apparatus of the type which is adapted to orient a plurality of hollow-bodied articles in a uniform and a discriminate manner.

An apparatus of the type to which the present invention is directed is particularly suited for orienting a random supply of hollow-bodied articles having an opening at only one end in accordance with a predetermined orientation. Thus, for example, such apparatus may be used to position a plurality of container caps for cans or bottles to contain liquid detergent or other goods or like devices in a uniform row with the openings of all of the caps facing in a given direction. Heretofore, machines employed for this purpose have exhibited several disadvantages. For example, it is frequently desirable to adjust the orienting apparatus quickly and easily to accommodate classes of articles of varying sizes and shapes and many such machines have proven deficient in this respect. Additionally, in machines of the type heretofore employed, the relatively slow rate at which the articles are oriented has impaired the use of such machines for many purposes.

One general object of this invention, therefore, is to provide a new and improved apparatus for orienting a plurality of articles which is particularly adaptable for arranging the articles in a uniform and discriminate manner. More specifically, it is an object of this invention to provide an apparatus which is adapted to properly orient a plurality of articles from a random supply thereof at a maximum rate.

Another object of this invention is to provide an orienting apparatus of the character indicated which is quickly and easily adjustable to accommodate groups of articles of widely varying dimensions.

Still another object of this invention is to provide an orienting apparatus utilizing comparatively simple mechanical elements, which apparatus is economical to manufacture and thoroughly reliable in operation.

In the drawings:

FIG. 3 is a sectional side view of the apparatus of FIG. 2, taken along line 3—3;

FIG. 4 is a sectional side view of the apparatus of FIG. 2, taken along line 4—4;

FIG. 5 is a sectional side view of the apparatus of FIG. 4, taken along line 5—5;

FIG. 6 is a sectional side view of the apparatus of FIG. 4, taken along line 6—6;

FIG. 7 is a sectional side view of the apparatus of FIG. 2, taken along line 7—7;

FIG. 8 is a sectional side view of the apparatus of FIG. 2, taken along line 8—8;

FIG. 9 is a sectional side view of the apparatus of FIG. 2, taken along line 9—9;

FIG. 10 is a sectional side view of the apparatus of FIG. 2, taken along line 10—10; and, FIG. 11 illustrates a typical simplified electrical control circuit of the air supply utilized in the apparatus of the present invention.

GENERAL ORGANIZATION

Figure 1:
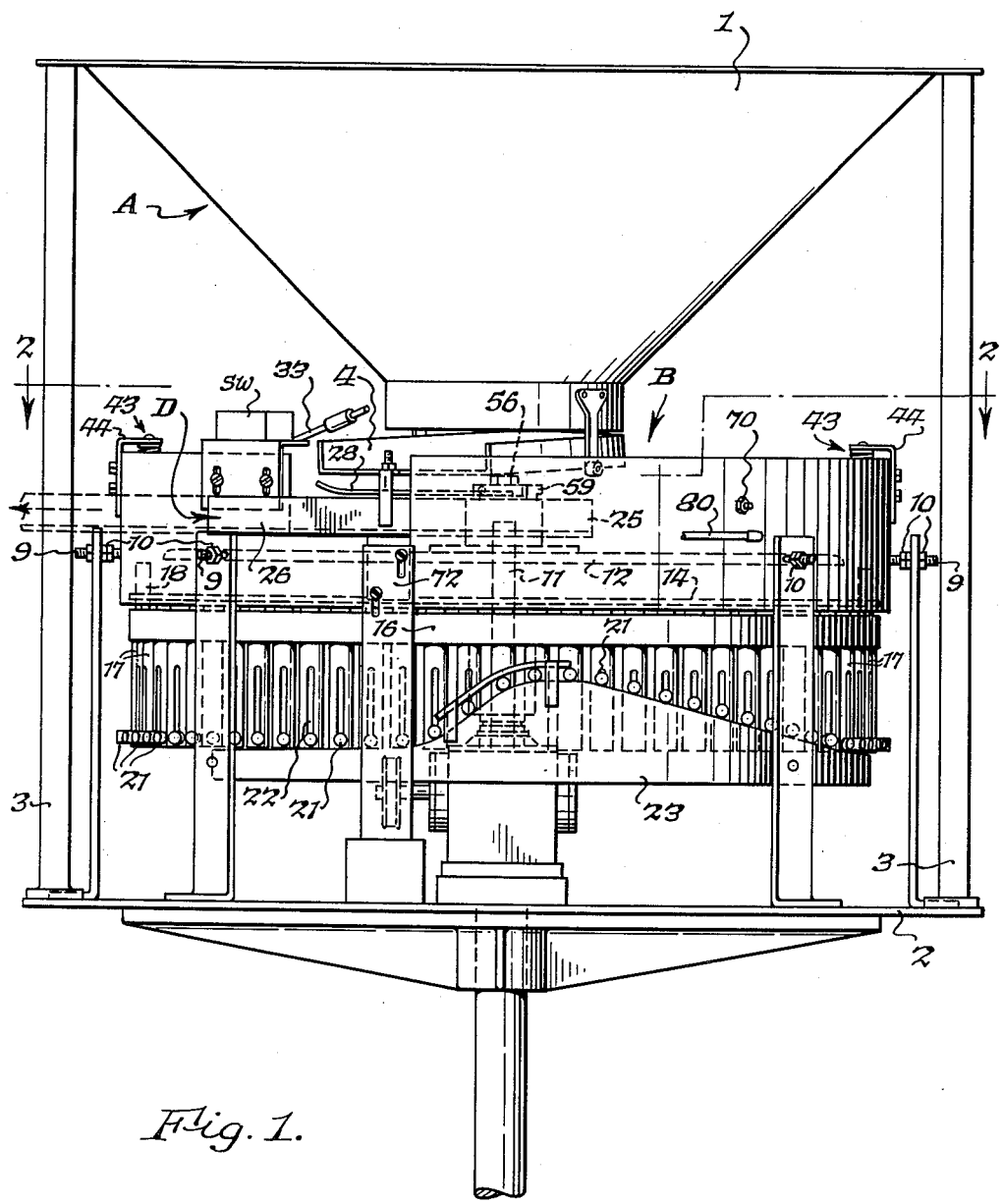
FIG. 1 is a side elevation of the feeding, orienting and delivering apparatus of the invention with its base not shown.

Referring to the drawings, it will be seen that the present invention is embodied in an apparatus for automatically feeding, orienting and delivering articles in the form of hollow-bodied caps C and includes a cap infeed means, generally indicated at A; a cap orientation means, generally indicated at B; and, a cap delivery means, generally indicated at D.

A plurality of caps C is introduced into the infeed means A which feeds them randomly to the orientation means B where they are properly oriented and transferred to the delivery means D which delivers the properly oriented caps to a work station, not shown.

INFEED MEANS

Referring to FIGS. 1 and 10 of the drawings, there is shown the cap infeed means A consisting of a delivery hopper 1 which is adapted to receive a random supply of container caps C or other articles to be oriented. The hopper 1 is supported above an apparatus support means 2 by legs 3 and includes a cap delivery chute 4 which is bounced up and down at its farther end by an adjustable air driven vibrator 5 in order to feed caps out of the hopper in a manner well known in the art.

TRANSFER AND ORIENTATION MEANS

The delivery chute 4 of the infeed means A is positioned directly above the cap orientation means B and is adapted, upon activation of the vibrator 5, to feed caps in a random orientation to the orientation means. The orientation means B includes a semi-cylindrical shell 7 having an opening 69 therein. The shell 7 is fixedly mounted on support means 2 by a plurality of L-shaped legs 8 and has a predetermined inside radius. The top portions of the legs 8 are provided with means defining openings adapted to receive the free ends of studs 9, the other ends of which are integral with the shell 7. Nuts 10 are adjustably positioned on stud screws 9 on each side of the legs 8 to hold the shell in place with respect to the legs. The inside radius of the shell 7 may be adjusted by simply changing the position of nuts 10 on the stud screws 9, for a purpose described below.

Disposed within the shell 7 and journalled for rotation in support means 2 is a shaft 11 which is adapted to be rotatably driven by an appropriate driving mechanism (not shown).

A feed disc 12 is connected to shaft 11, in a manner more fully described hereinafter, and is adapted to rotate upon rotation of the shaft. The disc 12, which is preferably formed of a plastic material, has a predetermined radius shorter than the radius of the shell 7 by a distance slightly longer than maximum outside diameter of a can cap or other article to be oriented and is provided with a curved edge 13 at its periphery, as shown in FIG. 3.

Also connected to the shaft 11, in a manner more fully described hereinafter, and adapted to rotate upon rotation of the shaft is a receiving disc 14. The disc 14 has a predetermined radius slightly shorter than the radius of the shell 7, has means defining a plurality of openings 15 arranged in a ring adjacent its periphery, and is disposed a predetermined distance below the feed disc 12.

Disposed a predetermined distance below the receiving disc 14 is a sorting disc 16. The disc 16 has an integral sorter disc hub 60 which is positioned about and fastened to the shaft 11 by means of a key and set screws 31 which are adapted to go into threaded holes, shown in FIG. 3, and is adapted to rotate upon rotation of the shaft. The sorting disc 16 has a predetermined radius substantially equal to the radius of receiving disc 14 and has means defining a plurality of annular cap pin sleeves 17 arranged in a ring adjacent its periphery, the lower portions of which extend below the sorting disc, as shown in FIG. 3.

Each of the sleeves 17 slidably receives a cap orientation pin 18 which is adapted at its upper end to accept the recessed portion 19 of a hollow-bodied cap C to orient it properly. Each pin 18 has a shank 20 on which a roller 21 is rotatably mounted to minimize friction when such pin is rotated with discs 14 and 16. Means are provided to form an elongated slot 22 in each of the sleeves 17 which is adapted to slidably receive the shanks 20 as the pins 18 are raised and lowered, and the roller 21 is adapted to travel along a cam track or reciprocating means 23, which is fixedly mounted on the support means 2, to impart reciprocating motion to the cap pins 18, in a manner well known in the art. As the pins reciprocate, the shanks 20 ride in the slots 22 which prevent rotational movement and limit vertical movement of the pins 18.

Figure 2:
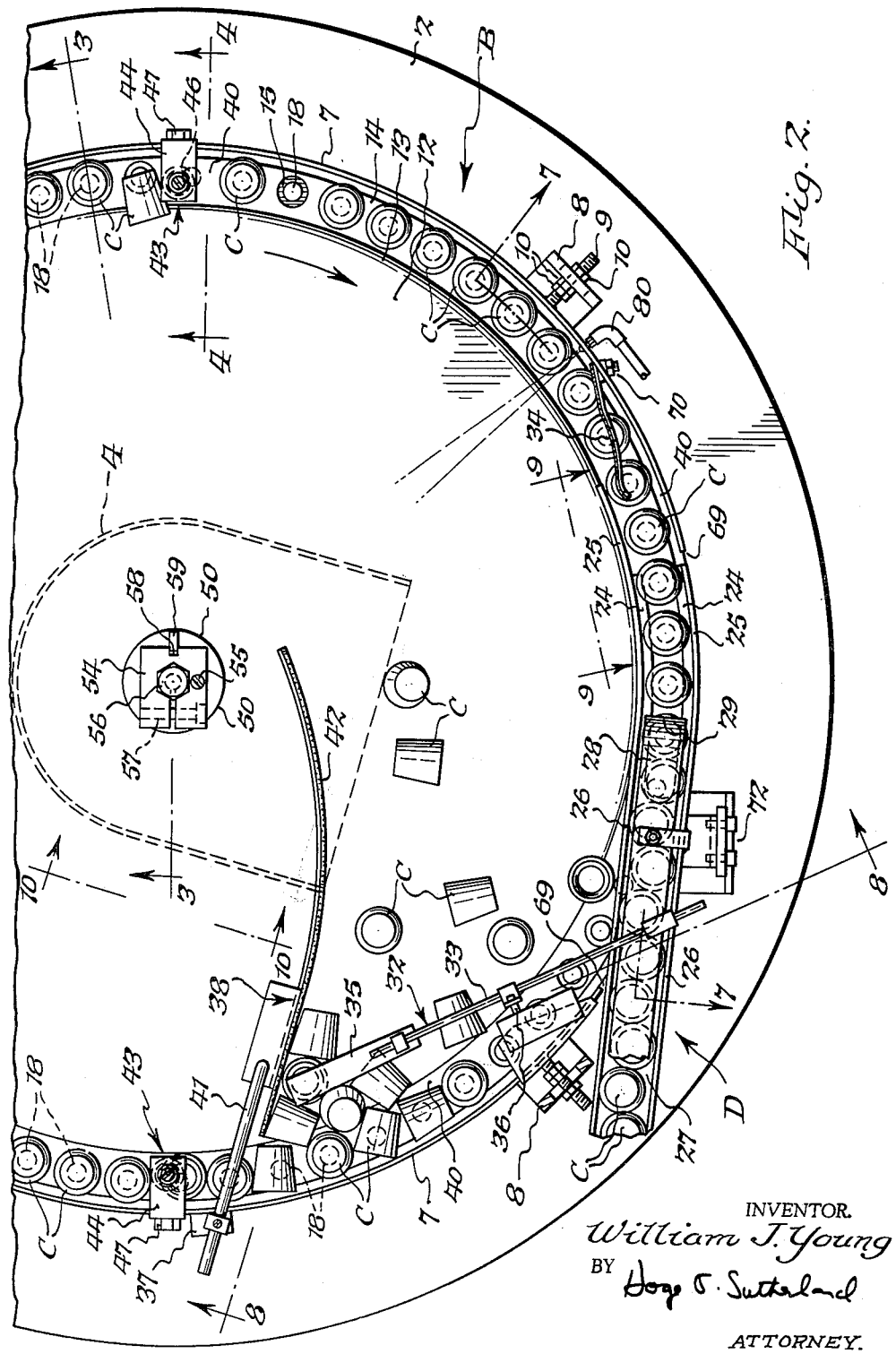
FIG. 2 is a fragmentary plan view of the apparatus of FIG. 1, taken along line 2—2.

In FIGS. 2, 8 and 11, there is shown a cap detector 32 which is operatively associated with the orientation means B to regulate the flow of caps from the infeed means A and onto the feed disc 12. The cap detector 32 consists of a shaft 33 having a detector means 35, in the form of a flexible shoe, secured to one of its ends which is adapted to rest lightly on the feed disc 12. The shaft 33 is connected at its mid-point to a pivotal mounting means 36 having a switch SW fixedly secured thereto which is adapted to shut off the air supply to the air driven vibrator 5 upon predetermined pivotal movement of the shaft and the mounting means due to the quantity of articles present on disc 12.

The air supply to the vibrator 5 is controlled by a solenoid-actuated valve V which is adapted to supply air to the vibrator when the switch SW is closed. When the detector means 35 is in its rest position on the feed disc 12, the switch SW is closed. When the detector means 35 is biased upwardly as by a cap under it, as shown in FIG. 11, the switch SW is opened and the electric current to the solenoid S is stopped and the valve V closes, thereby shutting off the air supply to the vibrator and halting the feed of caps from the infeed means A. A time delay unit is incorporated in the circuit to prevent momentary inactivation of the vibrator 5 in a manner well known in the art.

Positioned adjacent the cap detector 32 and fixedly secured to the shell 7 by an appropriate means, such as shown at 37 in FIG. 8, is an arcuate cap deflector 38 which is adapted to deflect caps into a trough 40 defined by the feed disc 12, the receiving disc 14 and the inside of the shell 7. The cap deflector 38 consists of L-shaped arm 41 having a deflector or plow means 42, in the form of an arcuate flexible shoe, secured to one of its ends and is adapted to plow the caps on the disc 12 into the trough 40.

As best seen in FIGS. 4, 5 and 6, a first cap rejector 43, which is adapted to reject inadequately oriented caps in the trough 40, is fixedly secured to the shell 7 by means of an L-shaped bracket 44. The rejector 43 consists of a spring 45 which is attached to the bracket 44 at its upper end and a flexible boot or rejector means 46 which is attached to the lower end of the spring 45. The rejector 43 is disposed above and slightly offset from the path of travel of the pins 18 in the trough 40 and is spaced a slight predetermined distance above the top of a cap C which is properly oriented on a pin 18. In FIG. 5, the rejector 43 is shown in contact with an improperly oriented cap which will either be deflected or tumbled along the trough 40 or deflected back onto the disc 12 by the rejector 43. The cap rejector also aids in the positioning of the caps not tumbled back along the trough 40 or deflected back onto the disc 12, by serving as a means to urge the caps onto the pins 18, as shown in FIG. 6.

The spacing of the boot 46 of the cap rejector 43 with respect to the top of a particular cap may be adjusted by loosening the cap screws 47 which secure the bracket 44 to the shell 7 and sliding the bracket up or down until the proper height is reached after which the screws 47 are retightened to hold the parts in place.

A second cap rejector 80, in the form of a continuous air jet, is positioned adjacent the cap take off means and is adapted to blow back, onto the feed disc 12, caps which are not properly oriented.

A third cap rejector 34, in the form of a flexible shoe, which is secured to the shell 7 by an appropriate means such as shown at 70 in FIG. 2, is positioned over the trough 40 and adjacent the second cap rejector 80. The third cap rejector 34 is disposed at a predetermined spaced angle above the caps and is adapted to reject or deflect back onto the feed disc 12 any improperly oriented caps not blown back by the second cap rejector 80.

The feed disc 12 and the receiving disc 14 are provided with means for adjusting their position on the shaft 11 with respect to each other and with respect to the sorting disc 16. As seen best in FIG. 3, the feed disc 12 has an integral feed disc hub 50 and the receiving disc 14 has an integral receiving disc hub 51 which are slidably received on the shaft 11 and by adjusting the position of the hubs 50 and 51 on the shaft 11, the distances between the feed, receiving, and sorting discs may be adjusted.

The receiving disc hub 51 of the receiving disc 14 has screw threads 52 which are adapted to engage screw threads 53 on the hub 50 of the feed disc 12, as shown in FIG. 3. An adjusting bolt clamp means 54 is fixedly secured to the hub 51 at its upper end by means of a cap screw 55, as shown in FIG. 2, and the clamp means 54 is adapted to receive and engage an adjusting bolt 56, the lower end of which is adapted to be received in a recess at the upper end of the shaft 11. A clamp screw 57 is threaded between the forks of the clamp means 54 to lock the bolt 56 in place and it is only necessary to loosen the screw 57 slightly to enable the bolt 56 to be screwed up and down with respect to the clamp means 54. The clamp means 54 has a key receiving slot 58 which is adapted to receive slidably an edge portion of a locking key 59, the other edge portion of which is adapted to be slidably received in one of a plurality of slots (two slots being shown on either side) in the hub 50 to connect the hub 50 adjustably to the clamp means 54 and through a single keyway 51' in the hub 51 to this hub 51.

The feed disc 12 may be adjusted with respect to the receiving disc 14 by removing the key 59 which connects the hubs 50 and 51 together and by axially rotating the hub 50 until the predetermined distance between the disc 12 and the disc 14 is obtained at which the caps C most easily drop over the pins 18. Then, the key can be reinserted in the slots on the hub 50 and the clamp means 54 lock the hubs 50 and 51 together again.

The feed and receiving disc 12 and 14 may be adjusted with respect to the sorter disc 16 by loosening the clamp screw 57 and then by screwing the bolt 56 up or down. Since the bottom of the bolt 56 is in contact with the top of the shaft 11, this action will cause the receiving disc 14 (and the feed disc 12) to slide on the shaft, toward or away from the sorting disc 16, which is fixedly secured to the shaft 11. When the desired distance above the sorting disc 16 is obtained, the set screw 57 can be retightened to lock the discs in place with respect to each other. The purpose here is to establish a predetermined height from the upper surface of the receiving disc 14 to the top of the pins 18. This height is always slightly less than the interior height of the cap being oriented. The effect is that properly positioned caps actually rest on the receiving disc until the pins are reciprocated sufficiently to raise them above the top surface of the disc 14, as will be further explained.

The disc 14 is connected to the disc 16 by means of a driving pin 62 which is integral with disc 14 and which is slidably received in a circular opening 63 in the disc 16 as shown in FIG. 3. As the disc 16 is rotated by the shaft 11, the disc 14 is rotatably driven with it by the driving pin 63. Disc 12 which is connected to the disc 14 through the key 59 is also rotatably driven upon rotation of the disc 14.

Adjacent the opening 69 of the shell and fixedly and adjustably mounted on the support means 2, by an appropriate means such as shown at 72 in FIG. 2 is a cap take off means in the form of arcuate tracks 24, having integral guide rails 25. The tracks 24 are spaced apart a distance greater than the diameter of a pin and less than the bottom outside diameter of a cap, for a purpose further to be described.

DELIVERY MEANS

Integral with the cap take off means is a delivery means D consisting of guide rails 26, which are straight-line extensions of curved guide rails 25, and a delivery chute 27 which extends between and is integral with the guide rails 26.

Associated with the cap take off means and the delivery means D and fixedly secured to one of the guide rails 26, by an appropriate means, is a top guide 28 having an upturned edge portion 29, as shown in FIG. 7. The upturned portion 29 of the guide 28 permits easy entrance of properly oriented caps into the outfeed means and the top guide 28 provides an additional means to control or guide the caps as they slide along the surface of the delivery chute to prevent tipping of these oriented caps.

OPERATION

A supply of like hollow-bodied container caps C is introduced in a random fashion into the hopper 1 of the infeed means A and, upon activation of the vibrator 5, are randomly fed out of the hopper and onto the feed disc 12.

Upon energization of the driving mechanism, the shaft 11 and discs 12, 14, and 16 which are connected thereto are rotated in a clockwise direction. As the disc 12 rotates, a small number of the caps is tumbled over the curved edge 13 of the disc and into the trough 40, which is defined by means of the feed disc 12, the upper surface of receiving disc 14, and the inside of the shell 7. The large share of caps, however, continue to be moved by the disc 12 and into contact with the plow means 42 of the arcuate cap deflector 38 which plows a substantial number of them on disc 12 into the trough 40. Those caps not plowed into the trough 40 at first contact with the plow means 42 are tumbled back along the disc 12 and those not tumbled into the trough by this action are again moved into contact with the plow means 42 and plowed, at least eventually, into the trough 40.

When there is an excessive buildup of caps at the end of the deflector 38 positioned adjacent the trough 40, they will tend to slide under and raise the detector means 35 to open the switch SW thereby deactivating the vibrator 5 and cutting off the feed of caps from the hopper to the feed disc 12. Here, the time delay unit prevents momentary inactivation of the vibrator 5 in case a single cap has become momentarily lodged beneath the detector means 35, but, if the time the switch SW remains open is sufficient, as where a number of caps move under and hold the detector means 35 up for a considerable length of time, the vibrator will be shut off. However, continued rotation of the disc 12 tends to dislodge the caps from beneath the detector means 35 and the deflector 42 plows them into the trough 40, thus allowing the detector means 35 to move to its rest position on the disc 12, thereby closing the switch to reactivate the vibrator to feed more caps onto the disc 12.

A number of the caps C that are tumbled by the disc 12 or plowed by the deflector means 42 into the trough 40 are immediately accepted over the tops of pins 18 and properly oriented. In this position, as shown in FIG. 3, the bottom periphery of the cap rests on receiving disc 14 and the top of the pin 18 is spaced a slight distance from the top interior surface of the cap. It will, therefore, be seen that the cap, when properly oriented, is supported only by the disc 14 and that the pin 18, in the rest or lowermost position, retains the cap in its properly oriented position as such pin is moved in a clockwise direction by the disc 14.

The caps in the trough 40 which are not immediately oriented are tumbled along the trough seeking an empty pin. If a cap in the trough has not been received by a pin by the time it reaches the first cap rejector 43, it is brought into contact with the rejector means 46 which rejects it and either deflects it back onto the disc 12 to again be deflected or plowed onto the trough 40 by the plow means 42 or tumbles it back along the trough to seek an empty pin as shown in FIGS. 2, 4 and 5. Or, if the cap is not tumbled back along the trough, the rejector means 46 serves as a means to urge it onto a pin 18, as shown in FIG. 6. The rejector means 46 is positioned slightly above the top surface of a properly oriented cap so that those caps which are properly oriented pass under it on their way to the delivery means D, as the disc 14 continues to rotate.

As a properly oriented cap passes under the rejector means 46, the pin 18 that receives it is in its rest position with the shank 20 resting at the bottom of the slot 22 which limits its downward movement. As the disc 16 continues to rotate the cap pin roller 21 of the pin 18 contacts the cam track 23 to start reciprocation of the pin in an upward direction, thereby lifting the cap positioned thereon from the receiving disc 14 and moving it upwardly. As shown in FIG. 7, as the roller 21 continues along the cam track 23, its pin 18 continues to move upwardly until the top of the cam track is reached. In this position, the bottom periphery of the cap has been raised above the tracks 24 of the cap take off means and the pin 18 is positioned in the space between the tracks 24. As rotation of the disc 16 continues, the pin 18 reciprocates downwardly due to the shape of cam 23, thereby lowering the cap onto the tracks 24 and moving out of the space between the tracks. The pin then continues downwardly until the shank 20 contacts the bottom of the slot 22 and it is in its rest position ready to receive another cap for orientation.

In the event a cap is not properly oriented by the time it reaches the cap take off means, it is either blown back onto the disc 12 by the second deflector means 80 or deflected back onto the disc 12 by the third deflector means 80.

As additional caps are deposited in the tracks 24, they push the preceding caps onto the delivery chute 27 and toward a work station, not shown.

As indicated before, the apparatus quickly and easily may be adjusted to accommodate caps of widely varying sizes, shapes, etc. To accomplish this adjustment, the inside radius of the shell 7 is adjusted by changing the position of the nuts 10 on the stud screws 9, so that the distance between the outside periphery of the feed disc 12 and the inside radius of the shell is sufficient to allow a cap to pass therebetween. The position of the receiving disc 14 with respect to the sorting disc 16 (and accordingly to the top of the pin 18) is then adjusted by loosening the set screws 57 and screwing the bolt 56 up or down as desired. When the pin 18 is spaced a slight distance from the top interior surface of the cap C, the set screw 57 is retightened to lock the parts in place. The position of feed disc 12 is then adjusted with respect to the receiving disc 14 to a height where the caps most easily drop over the pins 18 by removing the key 59 and axially rotating the hub 50 of the feed disc 12 until the proper height is reached and then replacing the key 59 in the slot in the hub 50 and the slot in the clamp means 54 and the slot or keyway 51' in the hub 51 to lock the parts in place.

Other obvious adjustments, such as positioning the deflector means 46 at its proper height above the top of the caps, are then made and the apparatus is adapted to properly orient the caps.

What is claimed is:

1. An apparatus for feeding, orienting and delivering a plurality of hollow-bodied articles comprising, in combination, article infeed means for feeding said articles in a random orientation, article delivery means for delivering said articles in a predetermined orientation, article orientation means disposed between and operatively associated with said infeed means and said delivery means and adapted to receive articles from said infeed means in random orientation and transfer said articles in a predetermined orientation to said delivery means, said orientation means including, a support means, a feed disc, a receiving disc and a sorting disc, all of said discs being rotatably mounted on said support means, a semi-cylindrical shell positioned around at least said receiving disc and said feed disc and fixedly mounted on said support means, said feed disc having a predetermined radius shorter than the radius of said shell by a distance slightly longer than a maximum outside diameter of the said articles to be oriented, said sorting disc having means defining a plurality of annular pin sleeves around its periphery, a plurality of article orientation pins slidably received in said sleeves and adapted to accept an article around the upper portion thereof to properly orient it and means to reciprocate said pins to deliver a said properly oriented article to a delivery means.

2. An apparatus for feeding, orienting and delivering a plurality of hollow-bodied articles comprising, in combination, article infeed means for feeding said articles in a random orientation, article delivery means for delivering said articles in a predetermined orientation, article orientation means disposed between and operatively associated with said infeed means and said delivery means and adapted to receive articles from said infeed means in a random orientation and transfer said articles in a predetermined orientation to said delivery means, said orientation means including, a support means, a semi-cylindrical shell having an opening therein fixedly mounted on said support means and having a predetermined inside radius, a center shaft disposed within said shell and rotatably mounted on said support means, a feed disc connected to said shaft and having a predetermined radius shorter than the radius of said shell by a distance slightly longer than the maximum outside diameter of the said articles, a receiving disc connected to said shaft and having a predetermined radius slightly shorter than the radius of said shell, said receiving disc being disposed a predetermined distance below said feed disc and having means defining a plurality of openings adjacent its periphery, a sorting disc connected to said shaft and having a predetermined radius substantially equal to the radius of said receiving disc, said sorting disc being disposed a predetermined distance below said receiving disc and having means defining a plurality of annular pin sleeves adjacent its periphery, said sleeves being in registry with said openings in said receiving disc, a plurality of article orientation pins slidably received in said sleeves and said openings, each of said pins having an upper portion disposed above said receiving disc and adapted to accept an article therearound to properly orient it, article take off means fixedly mounted on said support means and positioned adjacent said opening in said shell, said take off means being in the form of tracks, said tracks being spaced apart a distance greater than the diameter of said pins and less than the bottom outside diameter of said articles, and means to reciprocate said pins to raise a properly oriented article received around the upper portion thereof above said tracks and lower it on said tracks and then lower said pins beneath said tracks.

3. In the apparatus as set forth in claim 2, a first article rejector fixedly secured to said shell and being disposed a predetermined distance above said receiving disc, said predetermined distance being slightly greater than height of a properly oriented article.

4. The apparatus as set forth in claim 3, in which said first article rejector includes a spring having a flexible boot affixed thereto at its lower end.

5. In an apparatus as set forth in claim 2, a cap deflector fixedly secured to said shell and adapted to deflect the articles fed on to said feed disc by said infeed means from said feed disc and into a trough defined by said feed disc, said receiving disc and said shell.

6. In an apparatus as set forth in claim 5, in which said article deflector includes an arcuate deflector means.

7. In an apparatus as set forth in claim 2, an article detector pivotally secured to said shell and having article detector means adapted to slidably rest on said feed disc, said article detector further having means connected thereto adapted to regulate the flow of articles from said infeed means upon predetermined pivotal movement of said article detector.

8. In an apparatus as set forth in claim 2, means to adjust the inside radius of said shell.

9. In the apparatus as set forth in claim 2, means to adjust the distance between said receiving disc and said sorting disc.

10. In the apparatus as set forth in claim 2, means to adjust the distance between said feed disc and said receiving disc.

11. In the apparatus as set forth in claim 3, second and third article rejectors fixedly secured to said shell and disposed adjacent said take off means.

References Cited by the Examiner

UNITED STATES PATENTS

| | | |
|---|---|---|
| 1,179,916 | 4/16 | Havener. |
| 1,893,839 | 1/33 | Hutchinson et al. _____ 221—166 X |
| 1,913,648 | 6/33 | Warner _____ 221—166 |
| 1,973,720 | 9/34 | Lockie _____ 221—167 X |
| 2,065,319 | 12/36 | Lewis _____ 221—168 |
| 2,702,064 | 2/55 | Lange _____ 198—33.1 X |
| 2,853,176 | 9/58 | Kay et al. _____ 221—167 X |
| 2,892,567 | 6/59 | Smith et al. _____ 221—166 X |
| 2,959,324 | 11/60 | Hendrickson et al. _____ 221—168 |

SAMUEL F. COLEMAN, *Acting Primary Examiner.*

WILLIAM B. LA BORDE, *Examiner.*